Figure 3:
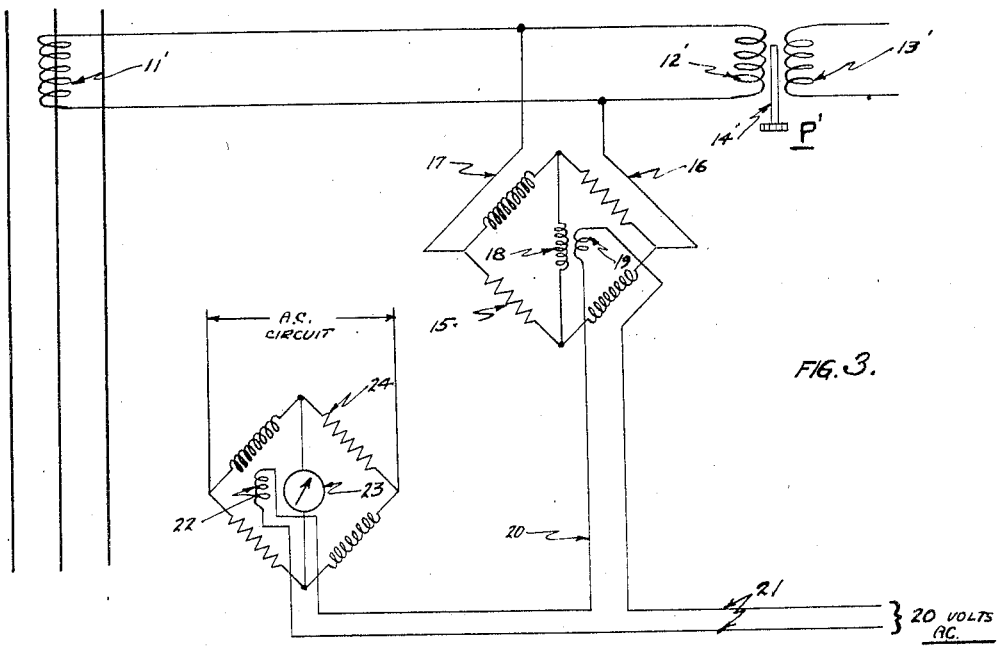

June 11, 1935.  B. W. HAMILTON  2,004,478

POWER CONTROL SYSTEM

Filed Aug. 27, 1931   2 Sheets-Sheet 1

INVENTOR
B. W. Hamilton
BY
Edward W. Whiteaway
ATTORNEY

Patented June 11, 1935

2,004,478

UNITED STATES PATENT OFFICE 2,004,478

POWER CONTROL SYSTEM

Benjamin W. Hamilton, Great Falls, Mont., assignor to S. Logan Kerr

Application August 27, 1931, Serial No. 559,665

19 Claims. (Cl. 171—119)

This invention relates generally to an improved method and apparatus for controlling alternating current power generating plants or systems and more particularly for controlling the system frequency simultaneously by a plurality of generating units or stations.

In large generating systems where accurate frequency control is required, it has been the practice in the past to employ only one generating station for the purpose of automatic frequency control, the remaining plants operating on fixed load either automatically or upon instructions from the system load dispatchers, or by some predetermined schedule based upon the operating conditions on that particular system. One object of my invention is to apply frequency control to several different plants operating simultaneously without the tendency for the load to drift from one station to another due to inaccuracies in the standards of the frequency control instruments. My invention introduces the effect of an inherent speed drop similar to that employed on prime mover governors for alternating current work and in addition provides a variation in sensitivity as a function of the departure of the unit load from a desired zone, thus tending to stabilize the frequency control and prevent drift of load between plants as well as providing zones of operation within which the control is free to act normally.

An example of the application of this invention will be in the case of two large generating stations both controlling frequency simultaneously. Each would have a definite zone in which to operate and should one station approach the limit of its zone the sensitivity of the frequency controller will be reduced so that its tendency to depart further from the desired zone would be reduced and finally would render the controller ineffective until the system conditions had changed and the load demand returned to the desired zone. This will assist not only in permitting multiple frequency control between various generating stations and generating systems but will also provide for frequency control with the assurance that the flow in a given hydroelectric plane equipped with this type of control will be kept within definite limits, thus facilitating the water balance between hydro-electric plants located on the same water shed. This invention is in the form of an improvement on automatic control installations for which patent applications have been filed by S. Logan Kerr, Serial Nos. 408,544 and 525,355, and permits the automatic control described therein (wherein frequency control and economic load distribution are effected together with the automatic transfer of units from load to condenser) to be utilized for a plurality of frequency controlling stations operating simultaneously on the same system rather than having one plant control the frequency alone while the remaining stations are maintained on base load automatically.

In a more specific aspect of the invention means are provided whereby the zones of operation are adjustable to meet the changing requirements of system operating during any operating period and adjustments are also provided whereby the ratio of inherent speed regulation as superimposed on the frequency controllers can be adjusted to the particular system requirements and also provide that the base of frequency control can be raised or lowered to simplify the maintaining of correct electric time through synchronous motor driven clocks.

Figure 2:
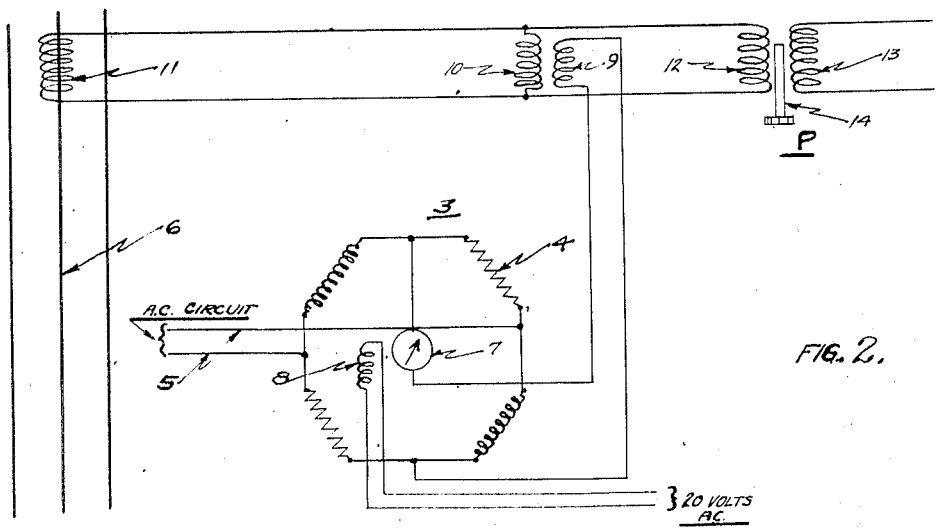
Figure 1:
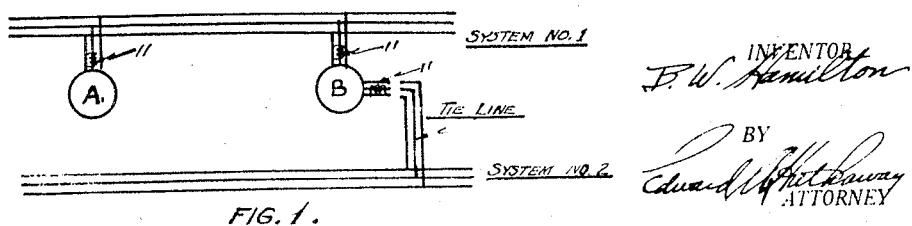

Other objects and advantages will be more apparent to those skilled in the art from the following description of the accompanying drawings, in which:

Fig. 1 is a diagram illustrating one system with a plurality of units or stations adapted to simultaneously control the frequency, while for purposes of further amplification a second system is shown as being interconnected with the first system through usual tie lines;

Fig. 2 is a diagram of a combined load and frequency controller adapted to respond to variations in load during the existence of normal frequency, or respond to variations in frequency during existence of normal load, with means whereby during simultaneous variation in both frequency and load the sensitivity of the controller is varied in accordance with variations in load either above or below a base load setting; and Fig. 3 is a modification wherein the frequency controller is primarily responsive only to variations in frequency from a predetermined normal value, the controller not being responsive to load variations although the sensitiveness of the controller is automatically varied in accordance with variations in load from a predetermined base load setting.

Figure 4:
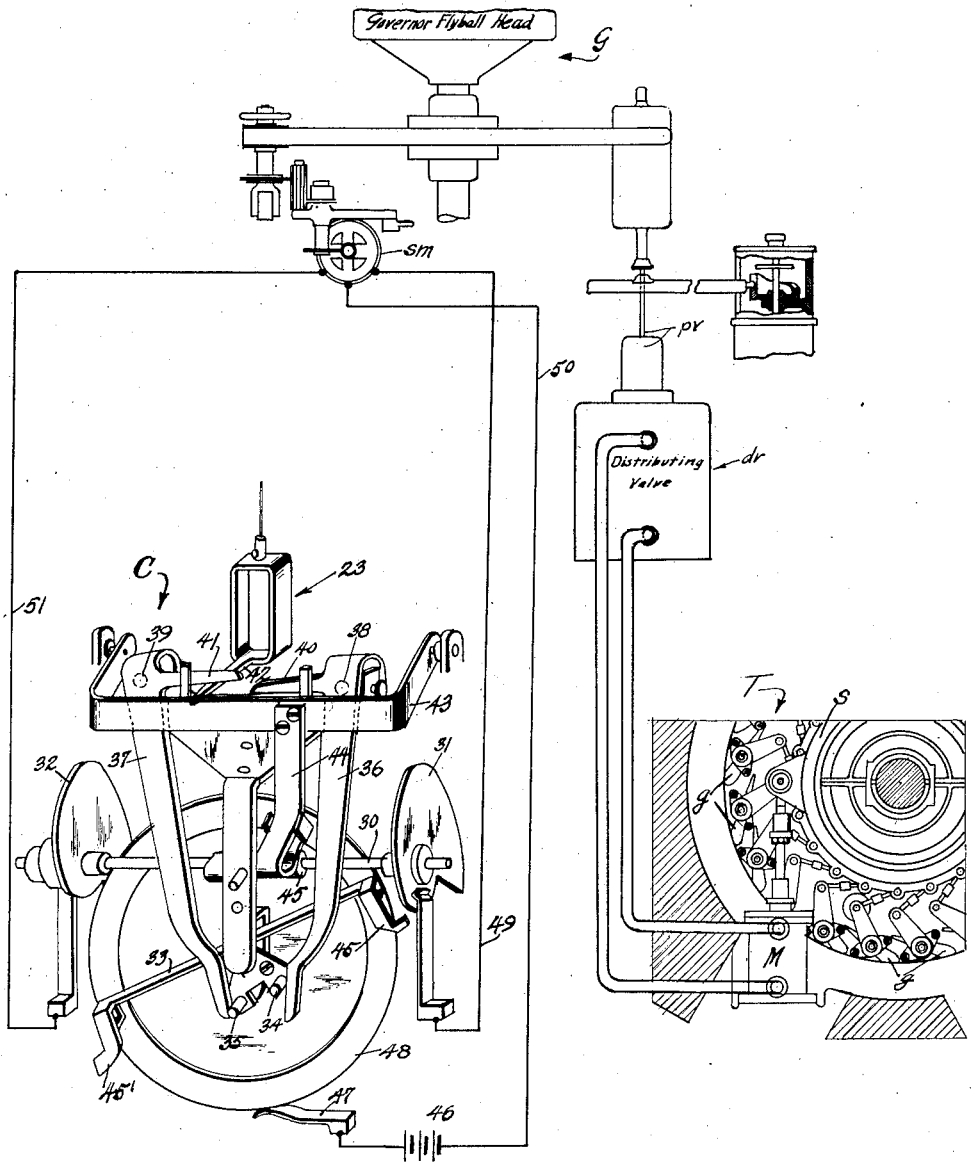

Fig. 4 is a diagrammatic illustration of a contact-making device for controlling a synchronizing or load adjusting motor of a governor which in turn controls the distribution of pressure fluid to a servo-motor for operating the valves of a prime mover such as a hydraulic turbine.

In describing the apparatus herein it will of course be understood that the same is applicable to various types of prime movers such as steam, internal combustion engines, or hydro-electric units or stations although the invention is particularly applicable to hydro-electric power equipment and systems. In considering the invention as applied to any of these various types of prime movers it is to be understood that usual speed responsive governors are employed to effect actuation of suitable valve mechanism for controlling the power input to the respective units or stations. In the case of a hydro-electric unit T, a usual type of speed governor G may be used having primary restoring mechanism and secondary compensating mechanism for the pilot valve generally indicated at $pv$ which in turn controls a distributing valve $dv$ for a gate operating motor M, assuming that a fluid actuated piston and cylinder type of motor is used although if desired other types of motors may be used with suitable mechanism controlled by the frequency and load controllers. The motor M is connected to a shifting ring S in turn connected to suitable links and arms to operate a series of wicket gates $g$. As described in Patent No. 1,901,831 of S. L. Kerr, it is usual for these governors to have a synchronizing or load adjusting motor $sm$ whereby the setting of the governor actuated element such as the pilot valve $pv$ may be varied even though the speed of the unit remains constant. The control apparatus as described herein is preferably of the galvanometer type having a suitable bridge circuit, such as a Wheatstone bridge, responsive to frequency variations from a predetermined normal value such for instance as 60 cycles. This bridge through a usual contact-making device such as generally indicated at C and described more in detail hereinafter is adapted upon swinging of the galvanometer from its neutral position to transmit current impulses to the synchronizing motor thereby to vary the power input to its respective unit until the necessary correction of power has been effected. The operation of the synchronizing motor and its manner of adjusting the pilot valve of the governor is fully described in said Kerr patent.

As illustrated in Fig. 1, there is shown a system labeled "System No. 1" having among possible other units two generating units A and B which if desired may also be considered as stations. A second system labeled "System No. 2" is connected to the first system by tie lines as indicated but for the present this second system and the tie lines will be considered as omitted and the apparatus described only as applied to one system. Each of a plurality of the units A and B is provided with control equipment as shown in Fig. 2 wherein a standard type of frequency controller 3 having a frequency responsive bridge 4 is connected through wire 5 to the system line or to the general bus 6 leading from the generator to the main system line. A galvanometer 7 has a field 8 supplied with alternating current from a bus or other suitable constant source while the galvanometer is connected to the secondary coil 9 of a specially designed transformer whose primary 10 is connected in parallel with a current transformer 11 and the secondary coil 12 of a meterman's phantom load P. The primary coil 13 is supplied from a constant source of current while the phantom load may be varied by adjusting the position of its core 14. In describing the operation of this equipment, it will be assumed for purposes of illustration that the phantom load device can be adjusted to obtain a variation from zero to 5 amperes in fractional ampere steps. The 5 ampere limit is preferable in order to have it conform with a standard 5 ampere current transformer which can be used for the transformer 11. The steps in fractional amperes of the phantom load will preferably be so proportioned that it represents the station, line or generator output in kw. It is possible by suitably adjusting the phantom load for the special transformer 11 in conjunction with any suitable type of bridge instrument to govern the amount of load to a minute degree of variation under normal operating conditions. There are several operating conditions which might exist, and these will be taken up in order as follows:

*Load control—Frequency regulation*

1. *Station load below base load setting—Frequency above normal.*—Fig. 2. It will be assumed that it is desired to maintain 30,000 kw. output on unit A. The phantom load will be adjusted as by core 14 to give a current of say 3 amperes through the secondary coil 12, the 3 amperes being assumed to correspond to the desired 30,000 kw. output. However, assuming that the unit is generating only 25,000 kw., the current transformer 11 is so designed that current induced therein will be only 2½ amperes. This leaves a difference of 0.5 ampere between the coils 11 and 12 with the result that current will flow through coil 10 and accordingly induce current flow through coil 9 and galvanometer 7. The galvanometer will accordingly deflect in a direction so that the controller will transmit corrective current impulses to the synchronizing motor and thereby increase the station or unit output until it equals the desired base load setting of 30,000 kw. When this occurs the current induced in transformer 11 will be 3 amperes, equal to the phantom load of 3 amperes and accordingly no differential current will flow in coil 10. The galvanometer thus remains in its neutral position.

However, if the frequency is greater than normal (assumed to be 60 cycles) the bridge 4, connected by wires 5 to the system, will tend to deflect the galvanometer 7 so that the load on the station will drop and thus restore the frequency to normal, but because of the station load being below the base load setting the action of the frequency in bridge 4 in tending to deflect the galvanometer is opposed by the differential load current from the current transformer 11 so that the station cannot drop any more load. Thus as far as this unit or station is concerned it cannot restore frequency to normal. However the frequency is brought back to normal by some other station on the system and when this occurs a differential current from transformer 11 is created due to the subnormal load thus deflecting the galvanometer until the controller has increased the station load to that of the base load setting. When the desired load adjustment has been effected the current in transformer coils 11 and 12 are equal, or as in the assumed case it will equal three amperes and no current will flow through special transformer 9, 10. With the load now remaining constant the frequency controller can handle small fluctuations in frequency until there again exists a high frequency combined with a load below the base load setting at which time any necessary load adjustment to correct the frequency must be made by another station.

2. *Station load below base load—Frequency below normal setting.*—The base load condition here is the same as in the operation just described while the frequency here is below normal rather than above as in the previous operation. With the frequency below normal its natural tendency is to cause the bridge 4 to deflect the galvanometer 7 in a direction to increase the station load in order to restore the frequency to normal. However, the station load is assumed to be below its base load setting as determined by the adjustment of the phantom load and hence the differential current in transformer 10 will also affect the galvanometer so as to increase the station output. Thus there is a double demand for increased output, one to correct the frequency and the other to increase the load. In this case the sensitiveness or responsiveness of the galvanometer is increased due to the accumulated action of the frequency and load so that the galvanometer deflects more than if only one of the subnormal conditions was present. Thus a greater rate of correction of the station output is brought about through the transmission of a greater number and longer current impulses to the synchronizing motor.

3. *Station load above base load—Frequency above normal setting.*—In this case the frequency being above normal would ordinarily tend to make the galvanometer respond in a direction so that its control would lower the station load. Also due to the station load being above normal, current is induced in transformer coil 11 greater than exists in the phantom load coil 12 and accordingly current flows through coils 9 and 10 to deflect galvanometer in a direction to reduce the station output. As a result of the current in transformer 11 being greater than in coil 12 the current now flows through coil 9 and galvanometer 7 in a direction opposite to what it was when the station load was lower than the base load setting as described with the first two conditions.

Hence the combined action of the high frequency and high load is accumulative in its effect on the galvanometer 7 and therefore it will deflect sufficiently so as to reduce the unit or station output to normal at a relatively rapid rate.

4. *Station load above base load setting—Frequency below normal.*—With low frequency the frequency controller would tend to increase the station output so as to correct the frequency although with the station load greater than the desired base load setting the controller would tend to reduce the station output. Hence it is seen that the tendency of these two conditions is to neutralize each other and thus not change the station output. The frequency therefore would be corrected by another station whose apparatus would automatically respond to the low frequency. With the frequency brought back to normal the differential current in the galvanometer circuit due to the subnormal load will deflect the galvanometer 7 in such a direction that the station load will drop down to the same value as that of the base load setting. With the station load back to normal it is seen that any variation in frequency would then cause the galvanometer 7 through its bridge 4 to deflect in order to increase or decrease the station output for correction of the frequency. However the range of frequency correction would be relatively small due to the fact that if the frequency is below normal it would tend to increase the station output above its base load setting and accordingly incur opposition from the current induced by the control transformer system 9—12. If the frequency was above normal so that the controller tended to reduce the station output, the output would then be below its base load setting and would oppose the frequency correction. It is thus seen that another station would have to take care of the wide fluctuations in frequency.

However, with two stations equipped with the control apparatus as described it is seen that the load cannot drift from one station to another even during any frequency control operation by some other station on the line which is equipped to control a wide range of frequency. The load is prevented from drifting due to the fact that the load controllers of the two stations are so designed that the current from the current transformer may predominate over any variation in frequency imposed on the apparatus through wires 5. Thus any frequency variation will have little effect upon the controller although with normal load, or substantially so within a very small limit, any small temporary frequency variations may be taken care of by the apparatus, providing the load change necessary to correct the frequency does not exceed the small load range for which the instrument is designed. This small band of load with which frequency may be controlled can be varied by changing the ratio of the special transformer 9, 10 with respect to the impedance bridge and galvanometer or vice versa. In other words, the sensitivity of the controller is varied automatically in accordance with variations from a predetermined base load setting so that the extent to which the station load may stray or vary is definitely limited, and even though the load may vary to the extent of this limited amount the control is so arranged that the load is positively brought back to the predetermined base load setting. It is thus possible to effectively control system load combined with a small amount of frequency control, automatically and simultaneously by a plurality of different stations on the system without any interconnected control between the control apparatus other than the system line and without any fear that inaccuracies in the standards of the control equipment for the respective stations or their prime movers will cause the load to drift entirely to one station as otherwise might be the case. It is thus seen that this equipment functions in a manner similar to the inherent speed drop mechanism that is normally employed on governors although the inherent speed drop thereof is unable to control frequency with the nicety of the equipment herein and is incapable of automatically adjusting the unit to establish and maintain a fixed base load. The present equipment not only has the advantage of obtaining the inherent speed drop characteristic but of also being able to return automatically the station load to the desired base load setting. With speed governors it is normally necessary to manually readjust a station output after the inherent speed drop mechanism has had its effect. It is further seen that the equipment herein combines in one instrument both load and frequency control functions adapted to be simultaneously operative and to functionally cooperate with each other to produce a resultant effect which may be either of an accumulative or opposing nature depending upon the conditions of operation, although the load control predominates and the frequency control is small.

*Frequency regulation with load zoning control*

The modification shown in Fig. 3 is adapted to regulate frequency within a certain limited load zone. In usual operation the value of the load allotted to take care of frequency over the system is predetermined by the system dispatcher. This load is then given to some one station or stations assigned to regulating frequency to take care of any swings or speed variations. However, this mode of operation does not always function with the greatest degree of efficiency. The load either goes beyond or under the high and low load limits allotted for these stations. The reason for this is probably caused by error involving the human element and it is one object of this invention and particularly of this modification to maintain the load within the high and low load limits set for these stations, thereby permitting the frequency to be controlled within this zone but when the load approaches the limits thereof the sensitivity of the frequency controlled is so controlled as to prevent further load adjustment of its particular station or unit. The line transformer 11' is connected in parallel with the secondary 12' of the meterman's phantom load P', the primary 13' being supplied with a constant source of potential as in the other form. The phantom load may be adjusted by the core 14' as previously described. However, instead of having a special designed transformer such as 9, 10 an impedance bridge 15 is connected as by wires 16 and 17 in parallel with transformer coils 11', 12'. Connected across the bridge is a primary winding 18 while a secondary winding 19 is connected in series with a galvanometer field 22 as by wire 20 while the field 22 and coil 19 are constantly connected by wires 21 to a source of preferably low A. C. voltage, this supply being from a common source for all A. C. which is constantly supplied to the various elements of the combination. A galvanometer 23 is connected across a bridge 24 which may be supplied from this common source of potential.

If the frequency is normal than any variation in load from some predetermined base load setting will cause current to circulate between transformer coils 11', 12' and accordingly to circulate through leads 16 and 17. However, due to the presence of normal frequency the current through leads 16 and 17 will simply circulate through the four arms of the balanced impedance bridge 15, no current flowing through the coil 18. However, if the frequency should vary from normal it will so unbalance the impedance bridge 15 that the current instead of flowing equally around the four arms of the impedance bridge will now divide and partially flow through coil 18. Upon flow of current in coil 18 a voltage will be induced in coil 19; this induced voltage, depending upon whether the frequency is above or below normal, will be either added to the voltage of the constant supply wires 21 or will buck the same. It is thus seen that the amount of current flowing in the galvanometer field 22, and accordingly the strength of the field, will be either increased or decreased below normal, thereby increasing its sensitivity on say high frequency and decreasing its sensitivity on low frequency. The galvanometer will deflect to cause the controller to transmit corrective impulses to the synchronizing motor and thus adjust the station output.

*Station load above base load setting—Frequency above normal.*—Assuming that the operator has set the phantom load P' for a given station base load then if the station load should for any reason go above this setting, a greater current will exist in coil 11' than in 12' with the result that this difference in current will circulate through the four arms of the impedance bridge 15. At a given normal frequency for which the bridge can be adjusted, the ohmic resistance of all four arms of the bridge is equal so that no current will flow through the primary winding 18. Consequently no voltage will be impressed upon the secondary winding 19. However, if the frequency should rise to a value above normal the bridge 15 will become unbalanced, causing current to flow in a given direction in the primary winding 18. This in turn will induce current in the secondary winding 19 which added to that of the constant supply 21 will boost the current in the galvanometer field 22 above its normal value and thus increase the sensitivity of the frequency controller. This increased sensitivity will bring the station back to its normal base load.

*Station load above base load setting—Frequency below normal.*—With the station load above base load, current will flow through the four arms in the impedance bridge in the same direction as in the previous arrangement and also no current will flow through coil 18 if the frequency is normal. Assuming, however, that the frequency drops, the bridge then becomes unbalanced and current will flow through coil 18 in an opposite direction to what it did on high frequency. This flow of current induces current in the secondary coil 19 and accordingly in the field 22 of the controller but in an opposite direction to what it did on high frequency. Accordingly, the induced voltage in coil 19 will now be in a direction opposite to the constant supply through wires 21 thereby reducing the current flow through the galvanometer field 22 below normal for a given variation in frequency. The field strength of the galvanometer is thus decreased which decreases its sensitivity. It is also seen that as the station load varies further and further above base load, a high limit will be reached where the instrument is insensitive.

The further away from base load that the station load departs the less sensitive the galvanometer frequency controller becomes until finally a limit is reached where the galvanometer is entirely insensitive. The result is that any additional load required to raise the frequency cannot be taken from this station but will be taken from some other station which is under either manual or automatic control. However, assuming the previous load conditions to still exist (above base load) and if the frequency rises instead of falls then the frequency controller becomes more sensitive, tending to bring the load back to normal setting much faster than if only the frequency variation occurred without any load variation. With station load now equal to the base load setting the frequency controller will operate as under normal conditions.

*Station load below base load—Frequency above normal.*—With the station load below base load, current will flow through the impedance bridge 15 in a direction opposite to that of the current when the station load was above base load. With normal frequency no current will flow through the primary coil 18 but if the frequency rises above 60 cycles or normal frequency, then the bridge 15 becomes unbalanced causing the current to flow through the secondary coil 19 which will oppose the current in the field 22 of the frequency controller, thus making the instrument less sensitive. The further below base load that the station departs in this direction the less sensitive the controller becomes until finally a low limit is reached where the instrument is insensitive.

*Station load below base load—Frequency below normal.*—The load conditions here are the same as just previously described except low frequency is now assumed to be present. The bridge 15 will again be unbalanced but current will flow through the primary coil 18 in a direction so as to induce current in coil 19 to boost or add to the current normally supplied to the field 22 by wires 21. The sensitivity of the controller is thereby increased so as to adjust the station load at a fast rate.

Instead of having the coils 11 and 11', Fig. 1, associated with the generator leads, one of these coils may be associated with the tie lines between systems, thereby controlling the output of a station in accordance with variations in frequency which might exist between two interconnected systems. It often happens that where two systems are interconnected the frequency variations in one or both systems is so great that their interconnection cannot be maintained or else the variation is such that an abnormal amount of current is drawn from one system to the other in order to maintain the desired relation of frequency and load relation. In this present arrangement a station or unit on either one or both systems may be equipped with the apparatus described herein in which case a load coil is associated with the tie lines as diagrammatically shown in Fig. 1.

*Contact-making device.*—The contact-making device C referred to in the paragraph following the description of the figures may be of any suitable type but one form applicable to this kind of work is shown in the lower left portion of Fig. 4 wherein a camshaft 30 is continuously rotated preferably at a constant rate of speed by any suitable motor. A pair of cams 31 and 32 carried by said shaft are adapted to periodically contact one end or the other of a pivotally supported arm 33 depending upon the direction of inclination of said arm. Secured to said arm so as to move therewith is a pair of pins 34 and 35 engageable with relatively long arms 36 and 37 which are pivoted as at 38 and 39 to a suitable stationary frame. These arms have inwardly projecting fingers 40 and 41 whose inner ends are slightly spaced from each other so that a pointer 42 of galvanometer 23 may be disposed between said adjacent ends without contacting the same, although this galvanometer pointer is long enough that it may pass beneath either one of arms 40 or 41 so as to be pinched between such arms and a vertically movable U-shaped arm 43. This U-frame carries an arm 44 adapted to have engagement with a cam 45 on camshaft 30. The description of this structure is only diagrammatic to illustrate the principle of transmitting electrical impulses to the synchronizing motor $sn$.

Briefly the operation of the above contact-making apparatus consists in having the galvanometer such as 7 or 23 mounted to swing a pointer 42 from its neutral position to beneath one or the other of arms 40 and 41 depending upon the direction of current flow through the galvanometer. The galvanometer pointer 42 is adapted to overlie U-bracket 43 and to be pinched thereon, so to speak, by the arms 40 or 41. With the pointer beneath say arm 41 as shown, then as cam 45 rotates, it causes arm 44 to swing U-frame 43 and accordingly raise pointer 42 against arm 41 and thereby cause arm 37 to swing around its pivot 39. Arm 37 thereupon engages pin 35 and moves the same in a counter-clockwise direction to cause arm 33 to assume the position shown. Continued rotation of camshaft 30 causes cam 31 to engage a finger 45 on the right end of arm 33 and rotate arm 33 in a clockwise direction until it is horizontal. During such rotation of arm 33, pin 35 will move arm 37 to a more vertical position without injury to the galvanometer pointer 42 inasmuch as cam 45 is so angularly related to cam 31 that arm 44 and U-frame 43 will swing downwardly to free the galvanometer pointer from beneath arm 41. It is thus seen that when cam 31 engages fingers 45, a circuit may be established from a battery 46 through a brush 47 engaging a disc 48 which is electrically connected to arm 33, the circuit then continuing through a contact between finger 45 and cam 31 to wire 49 and synchronizing motor $sn$ and back to the battery by wire 50. In case the galvanometer swings in the opposite direction to that shown in Fig. 4, then contact is made between cam 32 and finger 45' to complete a circuit through a wire 51 to rotate the synchronizing motor $sn$ in the opposite direction. It will be understood that the extent to which the galvanometer 23 swings will depend upon the amount of current flow therethrough and also it will be understood that the greater the extent of swing the shorter will be the fulcrum arm from pivot 38 or 39 to the point of engagement of pointer 42 with finger 41. The length of this fulcrum will determine the extent of rotation of arm 43 from its horizontal position and this in turn will determine the length of time of contact between fingers 45 or 45' and the cams 31 and 32. All of the foregoing disclosure of the contact-making device C is of a well-known construction and no claim whatsoever is made to this device per se.

From the foregoing description of both forms of the apparatus it will be seen that the following relations may be briefly summarized as applicable to both forms:

1. Station load above base load—High frequency.
   Frequency tends to lower load.
   Differential load current tends to lower load.
   Result—Accumulative action on galvanometer—controller more sensitive.

2. Station load above base load—Low frequency.
   Frequency tends to raise load.
   Differential load current tends to lower load.
   Result—Opposing action on galvanometer—controller less sensitive.

3. Station load below base load—High frequency.
   Frequency tends to lower load.
   Differential load current tends to raise load.
   Result—Opposing action on galvanometer—controller less sensitive.

4. Station load below base load—Low frequency.
   Frequency tends to raise load.
   Differential current tends to raise load.
   Result—Accumulative action on galvanometer—controller more sensitive.

The following additional relations are applicable to the Fig. 2 form (combined load and frequency controller):

Load Control—with limited amount of frequency regulation.

(1) Normal frequency—station load above base load.
   Frequency bridge is neutral.
   Differential load current will deflect galvanometer, lowering load until station load and base load setting are the same.

(2) Normal frequency—station load below base load.
Frequency bridge is neutral.
Differential load current will raise load to normal.

The following additional relations are applicable to the Fig. 3 form:

Frequency Control—with definite load zone.

With frequency normal—no current will flow through the special transformer connected across the impedance bridge. Therefore no deflection of the galvanometer can be obtained even though load varies from base load. Accordingly frequency variation is primarily essential whereas load variation merely modifies frequency correction. Frequency can therefore be corrected within high and low limits of modifying action of load.

It will be seen that in each modification frequency can be controlled within predetermined load limits. One difference between the two arrangements is that with the single bridge circuit any variation in load from the base load setting will immediately exert some influence on the galvanometer whereas with the two bridge circuits a load change accompanied with normal frequency has no influence on the galvanometer but as soon as the frequency varies from normal then any load variation within a given designed load zone will be effective in variably modifying the frequency correction until the limits of the zone are reached when frequency correction is completely counteracted. Due to the load having only a modifying action with no primary or direct influence on the galvanometer it is seen that the bridges and transformers can be designed to permit a load zone of wider extent than would be possible with the single bridge where the galvanometer is under the direct influence of load changes. Thus it is that the single bridge can take care of small frequency variations combined with its load controlling function whereas the two bridge circuit will take care of wide frequency variations which are usually accompanied by wide load fluctuations.

Hence it is seen that certain desirable results obtained with this equipment are that a single instrument is adapted for both load and frequency control, load control can be obtained with a limited amount of frequency regulation, and that once frequency has become normal the station load will come back to its original base load to maintain tie line loads, service flow and base load for general station conditions. Also frequency control may be maintained within a limited load zone and that once the load approaches or exceeds the limits of this zone either in the high or low limits thereof, some other station must pick up or drop the load as is necessary, thus allowing each controlling station to operate only within its load zone and preventing the drift of load from one station to another. As a result there is maintained a balanced system and all normal fluctuations are confined to the frequency controlling station.

It will of course be understood that various changes may be made in the construction and arrangement of parts of the invention without departing from the spirit of the invention as set forth in the appended claims.

I claim:

1. The combination in an alternating current system having a plurality of generating units, each unit having means for varying its input, means responsive to both frequency and load variations from predetermined values, and means controlled thereby for effecting actuation of said power input means to control both load and frequency.

2. The combination in an alternating current system having a plurality of generating units, each unit having means responsive to frequency variations from normal whereby a plurality of units are adapted to control frequency simultaneously, and means for varying the sensitivity of at least one of said frequency responsive means automatically in accordance with variations in the unit load from a predetermined value.

3. The combination in an alternating current system having a plurality of generating units, each of said units having a frequency controller whereby a plurality of said units are adapted to be simultaneously operative to control frequency, and means whereby each unit in controlling frequency is maintained within a definite load zone.

4. The combination in an alternating current system having a plurality of generating units, each of said units having a frequency controller whereby a plurality of said units are adapted to be simultaneously operative to control system frequency, and means for preventing the load on one unit drifting to another of said units during frequency control.

5. The combination in an alternating current system having a plurality of generating units, means whereby a plurality of said units are adapted to control frequency simultaneously automatically in accordance with variations from normal, and means for preventing drift of load from one unit to another during frequency control in the event of one unit or its control equipment functioning sluggishly in comparison to the functioning of another frequency controlling unit or its equipment.

6. The combination in an alternating current system having a plurality of generating units, a frequency controller associated with each of a plurality of said units whereby they are adapted to simultaneously control frequency automatically in accordance with variations thereof from a predetermined value, and means adapted to be self-contained with each frequency controller to maintain an output of their respective units within a predetermined maximum limit whereby the frequency controlling units may be located at widely spaced points along the system line without permitting drift of load between these units.

7. The combination in an alternating current system having a plurality of generating units, each of said plurality of units having a galvanometer frequency controller whereby the system frequency may be controlled simultaneously by a plurality of units, and means cooperating with said frequency controllers for determining the base load setting of the units.

8. The combination in an alternating current system having a generating unit, a frequency controller adapted during high frequency to lower the output of a unit, and means whereby when the unit load is above a predetermined value the frequency controller additionally tends to lower the unit output whereby an accumulative corrective action of the load output is effected.

9. The combination in an alternating current system having a generating unit, a frequency controller therefor adapted to lower the output of a unit upon occurrence of frequency above normal, and means whereby during occurrence of frequency above normal and of a unit output above a predetermined value the controller is rendered more sensitive than upon occurrence of either condition alone.

10. The combination in an alternating current system having a generating unit, a frequency controller adapted to increase the unit load automatically upon occurrence of frequency below normal, and means whereby upon a unit load above a predetermined value the frequency corrective action of the controller is opposed and thus rendered less sensitive.

11. The combination in an alternating current system having a plurality of generating units, a frequency controller adapted to lower the unit output upon occurrence of frequency above normal, and means whereby when the unit output is below a predetermined value simultaneously with the existence of frequency above normal the frequency correction of the controller is opposed.

12. The combination in an alternating current system having a plurality of generating units, a frequency controller adapted to raise the unit output upon occurrence of frequency below normal, and means whereby upon occurrence of a unit output below a predetermined value simultaneously with the low frequency the frequency controller is additionally actuated, thereby rendering the controller more sensitive to effect a greater rate of correction of the unit output.

13. The combination in an alternating current system having a generating unit, a frequency controller, means whereby during normal frequency the controller tends to be neutral, and means whereby upon occurrence of a unit output above a predetermined base load value said controller will respond automatically to this load variation, thereby to lower the unit load.

14. The combination in an alternating current system having a generating unit, a frequency controller tending to remain neutral during normal frequency, and means whereby upon occurrence of a unit output below a predetermined base load said frequency controller is actuated automatically in response to this load variation to raise the unit load to normal.

15. The combination in an alternating current system having a generating unit, a frequency controller tending to remain in neutral position during normal frequency, electrical means associated with said frequency controller and responsive to load variations from normal, and means whereby upon variation of frequency from normal said load responsive electrical means is then adapted to correct the unit output in accordance with the extent of both the frequency and load variations from their normal values.

16. The combination in an alternating current system having a generating unit, and means for controlling the frequency and load including a combined frequency and load controller having a galvanometer Wheatstone bridge.

17. The combination in an alternating current system having a generating unit, means for controlling the frequency and load including a combined frequency and load controller having a galvanometer Wheatstone bridge, and means associated with said bridge circuit for effecting a predetermined base load setting for the unit to be controlled.

18. The combination in an alternating current system having a generating unit, means for controlling the frequency and load including a combined frequency and load controller having a galvanometer Wheatstone bridge, and means including at least a pair of transformer coils adapted to be balanced against each other and having provision for controlling the current in one of said coils for determining a base load setting for the unit to be controlled.

19. A combined load and frequency controller including a Wheatstone bridge circuit, and means whereby current flow therethrough is controlled both by frequency and load conditions.

BENJAMIN W. HAMILTON.

CERTIFICATE OF CORRECTION

Patent No. 2,004,478.   June 11, 1935.

BENJAMIN W. HAMILTON.

It is hereby certified that error appears in the printed specification of the above numbered patent requiring correction as follows: Page 1, first column, line 47, for "plane" read plant; and page 4, first column, line 16, for "controlled" read controller; and that the said Letters Patent should be read with these corrections therein that the same may conform to the record of the case in the Patent Office.

Signed and sealed this 17th day of September, A. D. 1935.

(Seal)

Leslie Frazer
Acting Commissioner of Patents.